US009852557B2

(12) United States Patent
Selinder et al.

(10) Patent No.: US 9,852,557 B2
(45) Date of Patent: Dec. 26, 2017

(54) PHYSICAL ACCESS CONTROL SYSTEM

(71) Applicant: Axis AB, Lund (SE)

(72) Inventors: Emil Selinder, Lund (SE); Anders Hansson, Klagerup (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/381,845

(22) Filed: Dec. 16, 2016

(65) Prior Publication Data

US 2017/0178433 A1 Jun. 22, 2017

(30) Foreign Application Priority Data

Dec. 17, 2015 (EP) .................................... 15200765

(51) Int. Cl.
*G05B 19/00* (2006.01)
*G07C 9/00* (2006.01)

(52) U.S. Cl.
CPC ................................ *G07C 9/00111* (2013.01)

(58) Field of Classification Search
CPC .................................................. G07C 9/00111
USPC ..... 340/5.61, 5.53, 5.6, 5.8; 713/1, 172, 186
See application file for complete search history.

(56) References Cited

U.S. PATENT DOCUMENTS 9,142,069 B2 * 9/2015 Conlin ................ G07C 9/00111
2003/0217294 A1 11/2003 Kyle
2006/0224901 A1 * 10/2006 Lowe .................... H04L 63/062
713/186
2008/0290995 A1 11/2008 Bruns et al.
2010/0077466 A1 3/2010 Lowe
2012/0157058 A1 6/2012 Lowe
2013/0214899 A1 8/2013 Herscovitch et al.
2013/0222107 A1 8/2013 Herscovitch et al.
2015/0220711 A1 8/2015 Lowe
2015/0222613 A1 8/2015 Lowe
2015/0222622 A1 8/2015 Lowe
2015/0222623 A1 8/2015 Lowe
2015/0223066 A1 8/2015 Lowe
2015/0223067 A1 8/2015 Lowe
(Continued)

FOREIGN PATENT DOCUMENTS

EP 2 800 067 A2 11/2014
WO WO 2013/110074 A1 7/2013

OTHER PUBLICATIONS

European Search Report (with Written Opinion) dated Jun. 28, 2016 in European Application 15200765.4 dated Dec. 17, 2015.

*Primary Examiner* — Dhaval Patel
(74) *Attorney, Agent, or Firm* — Oblon, McClelland, Maier & Neustadt, L.L.P.

(57) ABSTRACT

A physical access control system, PACS, (100) comprises at least one reader (103) and a method performed comprises a number of actions that begin with obtaining a first indication that the at least one reader (103) requires reader configuration information. In response to the first indication, the control unit obtains the required reader configuration information. A protocol (108, 110) with which the at least one reader (103) is capable of communicating with a control unit (101) is determined and the required reader configuration information is then interpreted into protocol specific data. Using the determined protocol, the control unit (101) then transmits the protocol specific data to the at least one reader (103).

11 Claims, 4 Drawing Sheets

(56) References Cited

U.S. PATENT DOCUMENTS

2016/0005248 A1* 1/2016 Aase ....................... G06F 21/34
340/5.61

* cited by examiner

PHYSICAL ACCESS CONTROL SYSTEM

TECHNICAL FIELD

Embodiments herein relate to a physical access control system (PACS) and specifically to configuration of a reader in a PACS.

BACKGROUND

A typical PACS that is arranged at a site or building comprises a number of reader devices located at individual access points such as doors, gates etc. Other PACS components such as door contacts, electric strikes and exit buttons are usually arranged together with readers at access points. The readers are typically configured to be interacted with by means of an electronic tag that holds information related to a person that is in possession of the tag and the access rights and restrictions associated with the person holding the tag in the PACS. The electronic tag may be of several form factors, including a card. Tags and readers may operate according to any appropriate standard, including standards such as radio-frequency identification (RFID) and near field communication (NFC). Readers are connected, possibly via intermediate devices such as control panels, to a control unit. Data processing takes place in the control unit when a person presents a tag to a reader and thereby provides information via the reader to the control unit.

Even though a major part of the data processing involved in access control takes place in the control unit, a reader comprises processing and memory circuitry that is necessary for the reader to operate in the PACS. For example, a reader may contain computer code in the form of so-called firmware as well as other configuration data that is needed for being able to, e.g., communicate with tags as well as providing status information such as a battery charging level or other self-diagnostics that the control unit may need in order to control the PACS in a desirable way.

From time to time, the configuration of a reader may need correction or updating. Such correction or updating is achieved in present day PACSs by means of designated, i.e. special, tags that contain corrected or updated information that the reader reads when the designated tag is presented to the reader. This means that an operator who desires to update or correct the configuration of one ne or more readers will have to visit each and every reader at respective locations and present the special tag to the reader. Needless to say this will mean that, in a large PACS with a large number of readers distributed over a large area such as a multi-story building, the operator will have to spend an undesirable amount of time and effort.

A prior art system and method for remotely assigning and revoking access credentials using a near field communication equipped mobile phone is disclosed in US patent application publication 2006/0224901.

Some prior art systems, such as the "RFID access control reader with enhancements" disclosed in US patent application publication 2013/0214899 and "Cloud secure channel access control" disclosed in the international patent application publication WO 2013/110074, involve equipping a reader with a communication capability such that the reader connects to a remote computer server that provides configuration information to the reader. A drawback of such a system is that it requires comparably advanced processing capabilities for handling such communication.

Another prior art reader device and associated method is disclosed in the European patent application publication EP 2800067.

SUMMARY

In view of the above, an object of the present disclosure is to overcome or at least mitigate at least some of the drawbacks related to configuration of a reader in a PACS.

This object is achieved in one aspect by a method performed by a control unit in a PACS. The PACS comprises at least one reader and the method comprises a number of actions that begin with obtaining a first indication that the at least one reader requires reader configuration information. In response to the first indication, the control unit obtains the required reader configuration information. A protocol with which the at least one reader is capable of communicating with the control unit is determined and the required reader configuration information is then interpreted into protocol specific data. Using the determined protocol, the control unit then transmits the protocol specific data to the at least one reader. The protocol with which the at least one reader is capable of communicating with the control unit may in various embodiments be any of a Wiegand protocol and an open supervised device protocol, OSDP, based protocol as well as any proprietary or open protocol, clock/data based or message based protocol.

The obtaining of said first indication comprises reception, from a user interface in the control unit, user input that indicates that the at least one reader requires said reader configuration information. Furthermore, prior to the reception of the user input that indicates that the at least one reader requires said reader configuration information, an internet protocol, IP, address is provided to the at least one reader of the control unit for displaying in a user interface in the at least one reader.

That is, configuration of a reader in a PACS is achieved in a simple way without using a cumbersome and expensive distribution of special configuration cards, and unnecessary cost of electronic circuitry and infrastructure for communication with a computer server is avoided. This advantage is easy to appreciate, particularly in scenarios where a large and already existing PACS having a large number of older and, typically, simple readers are to be configured or updated with new firmware. For example, in older PACS the communication capability of readers does not enable the readers to communicate with computer servers due to the fact that there is no Internet protocol (IP) communication stack existing in such readers.

In some embodiments, the obtaining of the first indication may comprise receiving the first indication from the at least one reader.

The reader may display the IP address in a suitable way to a user who is present at the reader. The user may then, by using a portable computer, tablet or smartphone etc., communicate via an internet connection with the control unit and thereby perform actions related to the reader. An advantage of such a procedure can be appreciated when considering a large PACS. A large PACS may comprise hundreds of readers and several tens of control units. A user who is present at a reader may, in these embodiments, obtain direct information in the form of the displayed IP address about which of the control units the reader is connected to.

In some embodiments, the obtaining of the required reader configuration information may comprise retrieving information from a database connected to the control unit.

In some embodiments, the reader configuration information may comprise any of a set of computer instructions that are executable by a processor in the at least one reader and at least one parameter value for use by the reader when executing computer instructions. For example, reader firmware and smartcard/smart tag configuration.

In another aspect there is provided a control unit for use in a PACS, said PACS comprising at least one reader. The control unit comprises a processor, a memory and input/output circuitry. The memory contains instructions executable by the processor whereby the control unit is operative to obtain a first indication that the at least one reader requires reader configuration information, obtain, in response to said first indication, the required reader configuration information, determine a protocol with which the at least one reader is capable of communicating with the control unit, interpret the required reader configuration information into protocol specific data, and transmit, to the at least one reader, using the determined protocol, the protocol specific data.

The control unit is operative such that the obtaining of said first indication comprises reception, from a user interface in the control unit, user input that indicates that the at least one reader requires said reader configuration information. Furthermore, the control unit is operative to provide, prior to the reception of the user input that indicates that the at least one reader requires said reader configuration information, an internet protocol, IP, address to the at least one reader of the control unit for displaying in a user interface in the at least one reader.

In yet another aspect there is provided a computer program comprising instructions which, when executed on at least one processor in a control unit, cause the control unit to carry out the method as summarized above.

In yet another aspect there is provided a carrier comprising the computer program as summarized above, wherein the carrier is one of an electronic signal, an optical signal, a radio signal and a computer readable storage medium.

These other aspects provide the same effects and advantages as the method aspects summarized above.

DETAILED DESCRIPTION

Figure 1:
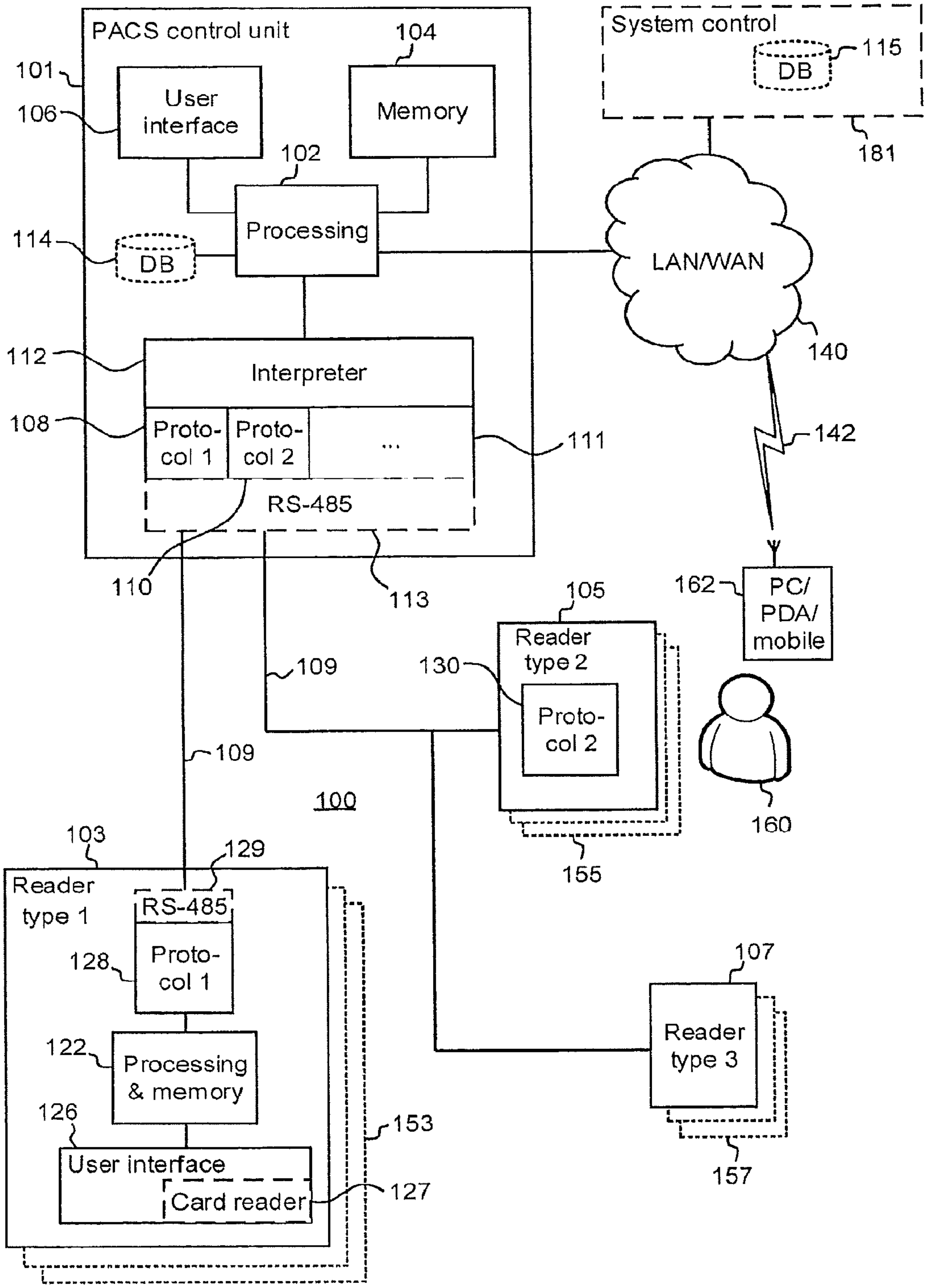
FIG. 1 schematically illustrates a PACS.

FIG. 1 illustrates schematically a PACS 100 in which a control unit 101 is connected to a number of readers. A first reader 103 is of a first type, a second reader 105 is of a second type and a third reader 107 is of a third type. The different types of reader may be characterized by hardware features as well as software and communication capability features. For example, the first reader 103 is configured with a user interface 126 that comprises a card reader 127 that is capable of communicating according to, e.g., RFID or NFC standards. The first reader 103 is further characterized in that it is configured to communicate with the control unit 101 via a first protocol 128. Processing and memory unit 122 controls the first reader in its operation.

The second reader 105 is similar to the first reader 103 having user interface, card reader etc. (not shown in FIG. 1) with which a user or operator 160 may interact. A difference with respect to the first reader 103 is that the second reader 105 is configured to communicate via a second protocol 130. The third reader 107 may be configured to operate and communicate via further protocols. Examples of the protocols 128, 130 include Wiegand and OSDP.

The readers 103,105,107 are connected to the control unit 101 via appropriate physical connections 109 that convey information coded according to the first and any second, third and further protocols. For example, the information may be conveyed via the physical connections 109 by means of a physical layer protocol RS-485, as exemplified with reference numerals 113 and 129 in FIG. 1 as an option, which may carry information in embodiments where, e.g., an OSDP based protocol is utilized. Embodiments where communication takes place by use of a Wiegand protocol, which itself is a physical layer protocol, do not necessitate the use of RS-485.

The control unit 101 comprises a processor 102, memory 104 and a user interface 106. The control unit 101 further comprises a function block that comprises an interpreter 112 that interfaces a function 111 that provides the first protocol 108,128, and the second protocol 110,130 and any number of further communication functions, such as further protocols.

As the skilled person will realize, the interpreter 112 and the function 111 that provides the protocols 108, 110 may be realized by the processor 102 and the memory 104. Similarly the processor and memory 122 may realize the corresponding first protocol 128 in the first reader 103.

The user interface 106 may be any suitable combination of software and hardware that provide a user, e.g. the user or operator 160 or any user located at the control unit 101 itself, access to PACS functions executed by the processor 102, including the embodiments of methods as will be described in some detail below. The control unit 101 may comprise a database 114 that may hold configuration information for the readers 103, 105, 107 as will be described further below.

The control unit 101 is further connected to a communication network 140, for example an internet connection. Users, such as the user or operator 160 may connect to the control unit 101 via a wireless communication device 162 that uses an interface 142. As the skilled person will realize, the wireless communication device 162 and the interface 142 may, e.g., operate according to a third generation partnership project (3GPP) standard as well as any appropriate Institute of Electrical and Electronics Engineers (IEEE) 802.11 standard. Moreover, although not illustrated in FIG. 1, one or more further control units may be operating in connection with the PACS 100. A system controller 181 may be connected to the PACS 100 and such a system controller 181 may comprise functionality related to the PACS 100, including a database 115, similar to the database 114 in the control unit 101, which may hold configuration information for the readers 103, 105, 107.

Needless to say, the PACS 100 may comprise a larger number of readers than the readers 103,105,107, as indicated by further readers 153 of the first type, further readers 155 of the second type and further readers 157 of the third type. Although not illustrated in FIG. 1, other types of PACS devices, such as electric strikes, door contacts etc., may also be connected to the control unit 101. Furthermore, the user or operator 160 may interact with any reader in the PACS 100 via the control unit 101 and other control units as will be illustrated below in connection with FIG. 2.

Figure 2:
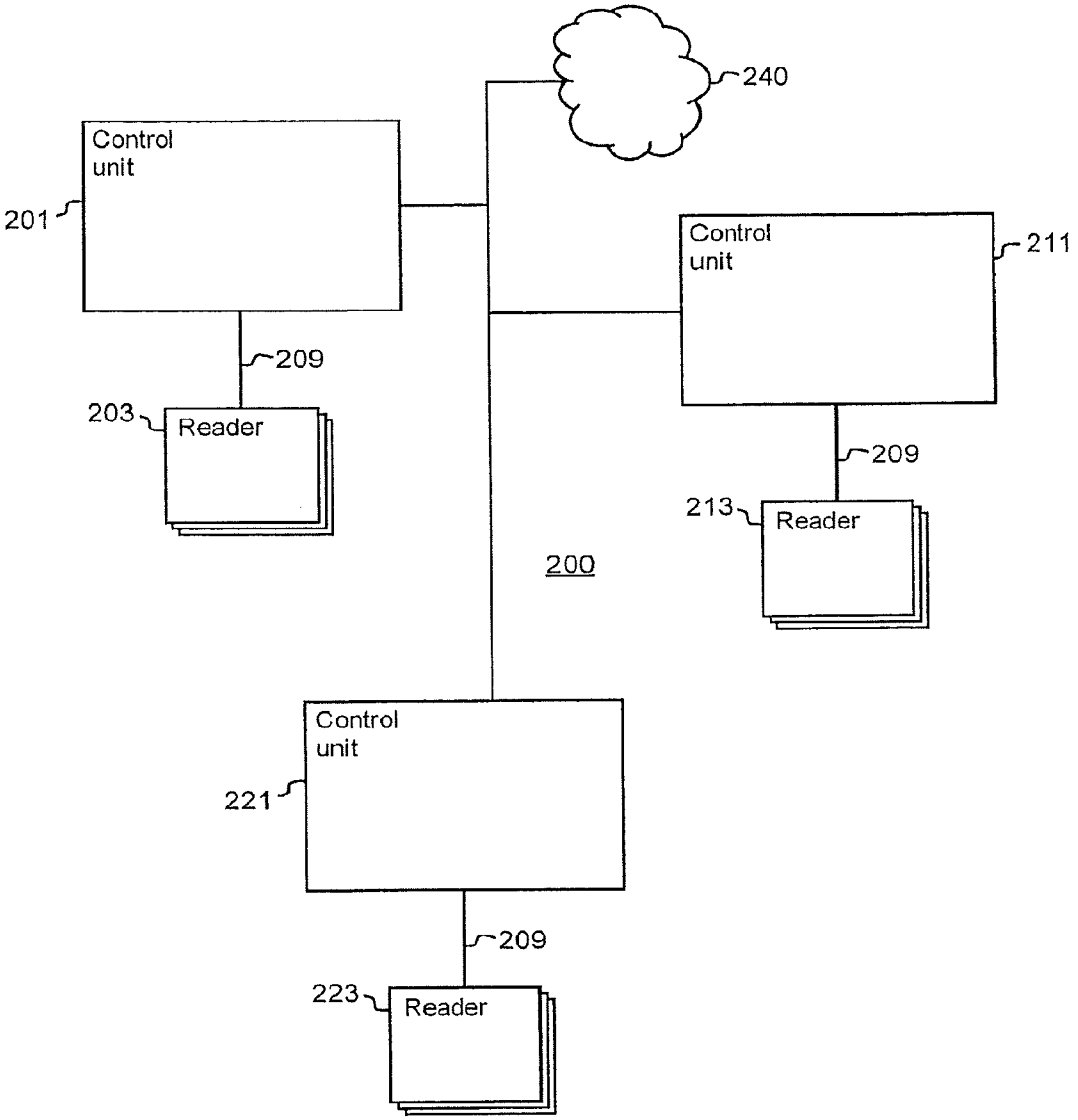
FIG. 2 schematically illustrates a PACS.

Moreover, now with reference to FIG. 2, another example of a PACS 200 includes a plurality of control units 201, 211, 221 that are connected via physical connections 209 to readers 203, 213, 223. As FIG. 2 attempts to exemplify, the number of readers that are connected to each control unit 201, 211, 221 is on the order of a few. In fact, a typical control unit in a PACS of the type described herein is connected to 5-10 readers and connected to a similar number of other PACS devices. The control units 201, 211, 221 are also connected to a communication network 240 via which users and operators may interact with the PACS 200. Needless to say, a typical installation of a PACS in a building may comprise several hundreds of readers and several tens of control units.

The control units 201, 211, 221 may comprise similar function blocks as the control unit 101 described above in connection with FIG. 1, including an interpreter function, first and second protocol functions and an optional physical layer protocol such as RS-485. The readers 203, 213, 223 may comprise similar function blocks as the first reader 103 described above in connection with FIG. 1, including a first protocol function and an optional physical layer protocol such as RS-485. The control units 201, 211, 221 may operate in relation to the readers 203, 213, 223 in the same manner as that of the control unit 101 described above in connection with FIG. 1.

Figure 3:
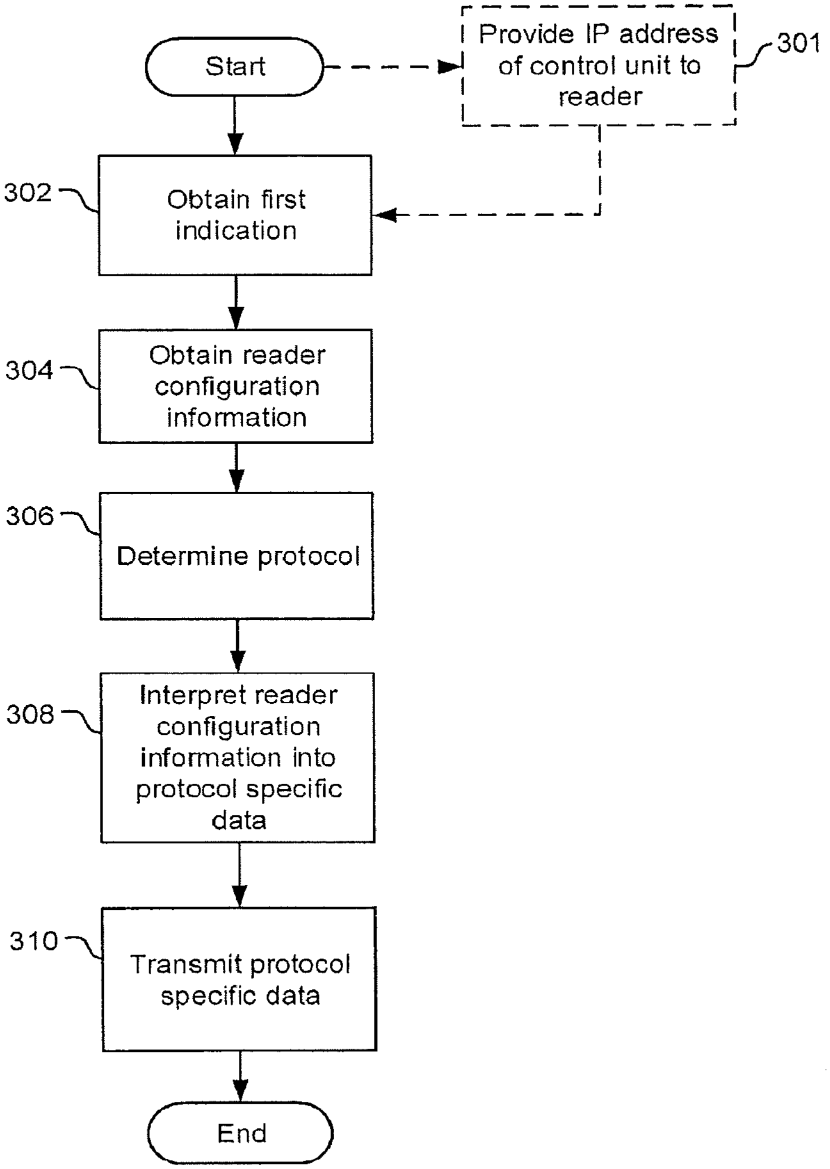
FIG. 3 is a flowchart.

Turning now to FIG. 3 and with continued reference to FIG. 1, an embodiment of a method in a control unit, such as the control unit 101 in the PACS 100 in FIG. 1, will be described in terms of a number of actions. The PACS comprises at least one reader, such as the first reader 103 in the PACS 100. As will be illustrated below in connection with embodiments of a control unit 400 and a computer program, the actions of the method in FIG. 3 may be realized by way of software executed by a processor such as the processor 102 in the control unit 101 in FIG. 1.

Action 302

A first indication that the at least one reader requires reader configuration information is obtained.

For example, the obtaining of the first indication may comprise receiving the first indication from the at least one reader. This may comprise a simple keying of a sequence of symbols on a keypad of the reader or it may also involve use of a smart-card inserted into the reader etc.

In some embodiments, the obtaining of the first indication may comprise receiving, from a UI in the control unit, user input that indicates that the at least one reader requires the reader configuration information. Such user input via the UI may be received via a system controller, e.g. the system controller 181 in FIG. 1

In some embodiments, prior to such reception from the UI of the user input that indicates that the at least one reader requires the reader configuration information, an IP address of the control unit may be provided to the at least one reader as exemplified by an optional action 301.

As mentioned above, a large PACS may comprise hundreds of readers and several tens of control units. A user who is present at a reader may, in these embodiments, obtain direct information in the form of the displayed IP address about which of the control units the reader is connected.

In any case, it should be pointed out that a typical scenario in which one or more readers are to be provided with configuration information is one where a user has decided that it is necessary to update the readers with up-to-date configuration information. A reason for such updating decision may be due to the simple fact that updated configuration information has become available following a finding that there are some error in the current configuration information or that functionality is to be deleted or added to one or more readers. Also, a reader may visualize (or in some other way) indicate to a user that the reader configuration should be updated. In such a typical scenario, the obtaining of the first indication is the actual trigger for commencing the sequence of updating the configuration information.

Action 304

In response to the first indication obtained in action 302, the required reader configuration information is obtained.

For example, the obtaining of the required reader configuration information may comprise retrieving information from a database connected to the control unit. As illustrated in FIG. 1, such a database 114 may be located in or at least close to the control unit 101 and also located at a more remote location accessible via a network such as the database 115 that is part of the system controller 181.

The reader configuration information may comprise a set of computer instructions that are executable by a processor in the at least one reader. The reader configuration information may also comprise at least one parameter value for use by the reader when executing computer instructions. In other words, the configuration information may be so-called firmware as well as configuration information related to, e.g., a card or tag reader in the at least one reader. Examples include: specification of how personal identification numbers (PIN) are to be used, specification of blinking sequences of light emitting diodes (LED) for providing feedback to a user/operator, specification of audio feedback, specification of functionality of firmware blocks (encryption, complete sets of firmware etc.), specification of encryption keys, specification of types of cards and tags, specification of radio sensitivity (e.g. in terms of distances between card/tag and reader), etc.

Action 306

A protocol with which the at least one reader is capable of communicating with the control unit is determined.

For example, the protocol with which the at least one reader is capable of communicating with the control unit may be a Wiegand protocol, and it may also be an OSDP based protocol as well as any proprietary or open protocol, clock/data based or message based protocol.

Action 308

The required reader configuration information is then interpreted into protocol specific data.

For example, such an interpretation may be realized by way of so-called "manufacturer specific commands" within the context of OSDP, into which any information may be mapped, such as:

- expect package of size X, md5, receive data. Unpack data: of size key: value (blink:5 seconds)
- start own custom protocol, communicate until finished with an escape signal (alternative protocol mode).

Action 310

Using the determined protocol, the protocol specific data is then transmitted to the at least one reader.

In some embodiments, communication may take place between, e.g., the first reader 103 and the control unit 101 such that the first reader 103 provides the control unit 101 with information. The first reader may thereby provide the user or operator 160, with diagnostic information such as a current operational status, battery charging level and other information related to the first reader 103 that may be of interest. In such embodiments, the interpreter 112 operates to translate such diagnostic information from the first protocol 128, 108 into information that is suitable for the user 160.

Figure 4:
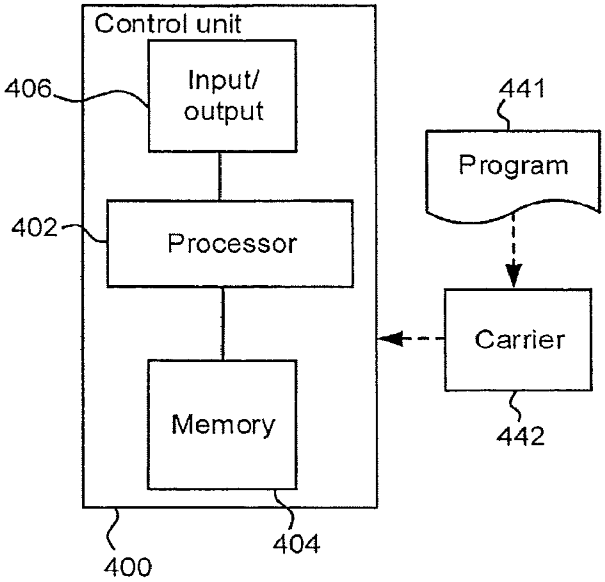
FIG. 4 schematically illustrates a block diagram of a control unit.

Turning now to FIG. 4, a control unit 400 will be described in some more detail. The control unit 400 is for use in a physical access control system PACS, comprising at least one reader. The control unit comprises a processor 402, a memory 404 and input/output circuitry 406. The memory contains instructions executable by the processor 402 whereby the control unit 402 is operative to:

obtain a first indication that the at least one reader requires reader configuration information, obtain, in response to said first indication, the required reader configuration information, determine a protocol with which the at least one reader is capable of communicating with the control unit, interpret the required reader configuration information into protocol specific data, and transmit, to the at least one reader, using the determined protocol, the protocol specific data.

The instructions that are executable by the processor 402 may be software in the form of a computer program 441. The computer program 441 may be contained in or by a carrier 442, which may provide the computer program 441 to the memory 404 and processor 402. The carrier 442 may be in any suitable form including an electronic signal, an optical signal, a radio signal or a computer readable storage medium.

In some embodiments, the control unit 400 is operative such that the obtaining of the first indication comprises:

receiving the first indication from the at least one reader.

In some embodiments, the control unit 400 is operative such that the obtaining of the first indication comprises:

receiving, from a user interface, UI, in the control unit, user input that indicates that the at least one reader requires said reader configuration information.

In some embodiments, the control unit 400 is operative, prior to the reception of the user input that indicates that the at least one reader requires said reader configuration information, to:

provide, to the at least one reader, an internet protocol, IP, address of the control unit.

In some embodiments, the control unit 400 is operative such that the protocol with which the at least one reader is capable of communicating with the control unit is any of:

a Wiegand protocol, and an open supervised device protocol, OSDP, based protocol, a proprietary protocol, an open protocol, a clock/data based protocol, and a message based protocol.

In some embodiments, the control unit 400 is operative such that the obtaining of the required reader configuration information comprises retrieving information from a database connected to the control unit.

In some embodiments, the control unit 400 is operative such that the reader configuration information comprises any of:

a set of computer instructions that are executable by a processor in the at least one reader, at least one parameter value for use by the reader when executing computer instructions.

Figure 5:
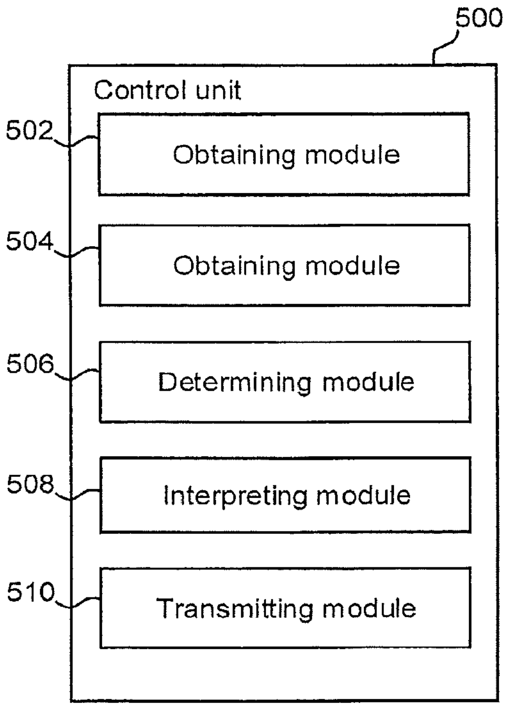
FIG. 5 schematically illustrates a block diagrams of a control unit.

FIG. 5 illustrates schematically a control unit 500 that comprises:

an obtaining module 502 configured to obtain a first indication that the at least one reader requires reader configuration information, an obtaining module 504 configured to obtain, in response to said first indication, the required reader configuration information, a determining module 506 configured to determine a protocol with which the at least one reader is capable of communicating with the control unit, an interpreting module 508 configured to interpret the required reader configuration information into protocol specific data, and a transmitting module 510 configured to transmit, to the at least one reader, using the determined protocol, the protocol specific data.

The control unit 500 may comprise further modules that are configured to perform in a similar manner as, e.g., the control unit 400 described above in connection with FIG. 4.

The invention claimed is:

1. A method performed by a controller in a physical access control system (PACS) said PACS comprising at least one reader, the method comprising:

obtaining a first indication that the at least one reader requires reader configuration information, obtaining, in response to said first indication, the required reader configuration information, determining a protocol with which the at least one reader is capable of communicating with the controller, interpreting the required reader configuration information into protocol specific data, and transmitting, to the at least one reader, using the determined protocol, the protocol specific data, wherein said obtaining of said first indication comprises reception, from a user interface in the controller, user input that indicates that the at least one reader requires said reader configuration information, and the method further comprises:

providing, to the at least one reader, prior to reception of the user input that indicates that the at least one reader requires said reader configuration information, an internet protocol (IP) address of the controller for displaying in a user interface in the at least one reader.

2. The method of claim 1, wherein the obtaining of the first indication comprises:

receiving the first indication from the at least one reader.

3. The method of claim 1, wherein said protocol with which the at least one reader is capable of communicating with the controller is any of:

a Wiegand protocol, an open supervised device protocol (OSDP) based protocol, a proprietary protocol, an open protocol, a clock/data based protocol, and a message based protocol.

4. The method of claim 1, wherein the obtaining of the required reader configuration information comprises retrieving information from a database connected to the controller.

5. The method of claim 1, wherein said reader configuration information comprises any of:

a set of computer instructions that are executable by a processor in the at least one reader, at least one parameter value for use by the reader when executing computer instructions.

6. A controller for use in a physical access control system (PACS) said PACS comprising at least one reader, the controller comprising a processor, a memory and input/output circuitry, said memory containing instructions executable by said processor to cause the controller to:

obtain a first indication that the at least one reader requires reader configuration information, obtain, in response to said first indication, the required reader configuration information, determine a protocol with which the at least one reader is capable of communicating with the controller, interpret the required reader configuration information into protocol specific data, and transmit, to the at least one reader, using the determined protocol, the protocol specific data, wherein said obtaining of said first indication comprises reception, from a user interface in the controller, user input that indicates that the at least one reader requires said reader configuration information, and the controller is further configured to:

provide, to the at least one reader, prior to reception of the user input that indicates that the at least one reader requires said reader configuration information, an internet protocol (IP) address of the controller for displaying in a user interface in the at least one reader.

7. The controller of claim 6, wherein in the obtaining of the first indication the controller is further configured to receive the first indication from the at least one reader.

8. The controller of claim 6, wherein said protocol with which the at least one reader is capable of communicating with the controller is any of:

a Wiegand protocol, and an open supervised device protocol (OSDP) based protocol, a proprietary protocol, an open protocol, a clock/data based protocol, and a message based protocol.

9. The controller of claim 6, wherein the controller, in obtaining of the required reader configuration information, retrieves information from a database connected to the controller.

10. The controller of claim 6, wherein said reader configuration information comprises any of:

a set of computer instructions that are executable by a processor in the at least one reader, and at least one parameter value for use by the reader when executing computer instructions.

11. A non-transitory computer-readable medium encoded with computer-readable instructions therein that, when executed by a processor, cause the processor to perform the method according to claim 1.

* * * * *